Oct. 7, 1941.                F. A. NIEMANN                2,257,759
                           CLUTCH MECHANISM
                        Filed March 11, 1939           2 Sheets-Sheet 1

INVENTOR.
Frederick A. Niemann
BY Charles B. Rasmussen
ATTORNEY.

Oct. 7, 1941.  F. A. NIEMANN  2,257,759
CLUTCH MECHANISM
Filed March 11, 1939  2 Sheets-Sheet 2
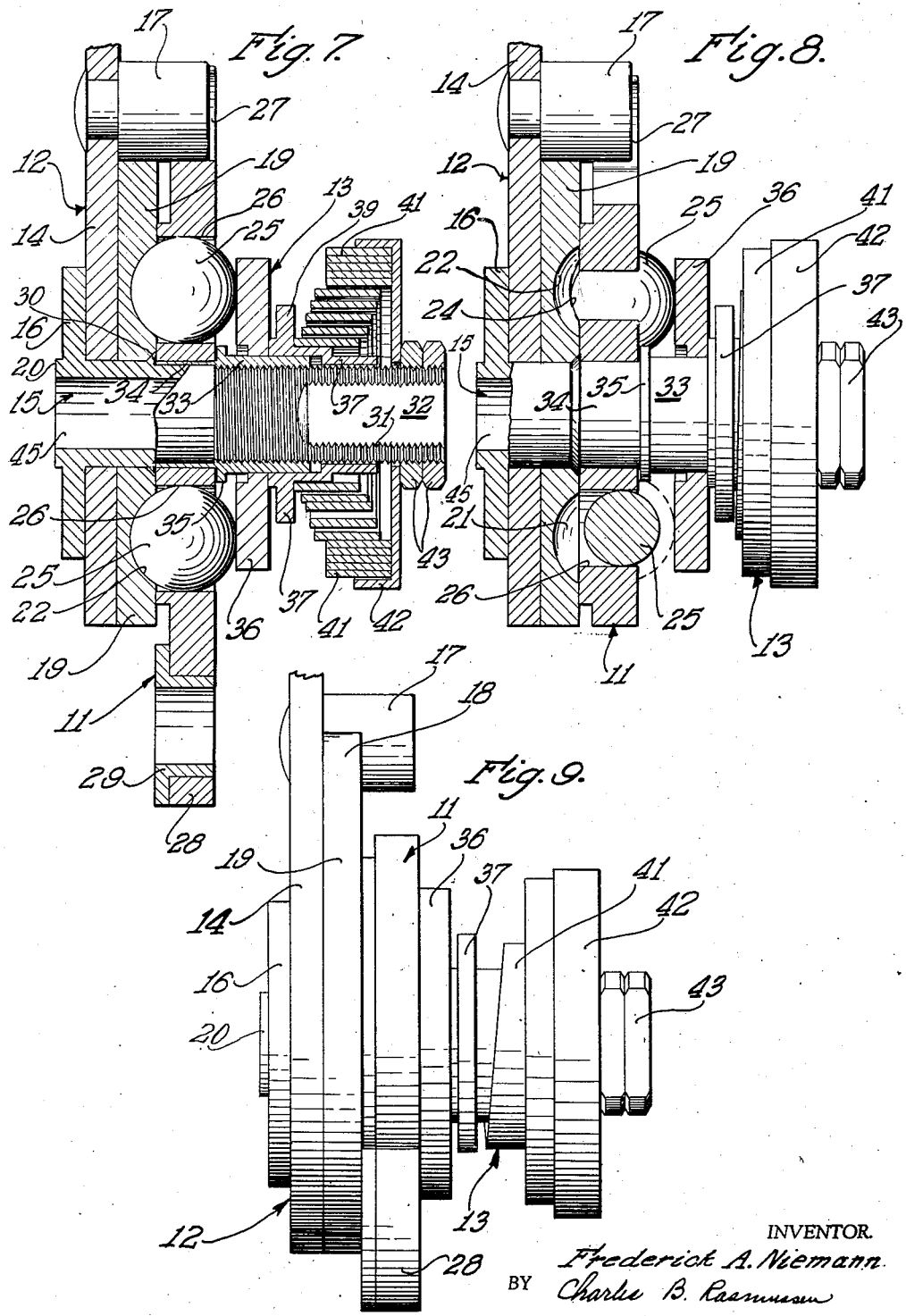
INVENTOR.
Frederick A. Niemann
BY Charlie B. Rasmussen
ATTORNEY.

Patented Oct. 7, 1941

2,257,759

UNITED STATES PATENT OFFICE 2,257,759

CLUTCH MECHANISM

Frederick A. Niemann, Chicago, Ill., assignor to Felt & Tarrant Mfg. Co., Chicago, Ill., a corporation of Illinois Application March 11, 1939, Serial No. 261,292

6 Claims. (Cl. 192—56)

This invention relates in general to clutches, and more particularly to spring tensioned slip clutch mechanism.

A principal object of the invention is the provision of novel clutch mechanism, comprising a driving member, a driven member, and improved connections therebetween which permit limited movement of the driving member relative to the driven member when the magnitude of the resisting force set up by the former exceeds a predetermined value.

Another important object of the invention is the provision of frictional connections between a driving member and a driven member which may be readily adjusted to vary the force exerted thereby to resist relative movement between the driven and driving members.

A further important object of the invention is the provision of such connections which include a volute or flat coil spring formed and housed to exert pressure in a lateral or axial direction of a substantially constant magnitude within its working range.

Numerous other objects and advantages of the invention will be apparent as it is better understood from the following description, which, when taken in connection with the accompanying drawings, discloses a preferred embodiment thereof.

In the drawings:

Figure 7 is an enlarged vertical sectional view taken substantially on the line 7—7 of Fig. 1;

Figure 8 is an enlarged vertical sectional view through the clutch mechanism with the parts thereof in partially extended position; and Figure 9 is an enlarged side elevation of the mechanism in the position of Fig. 2.

Figure 1:
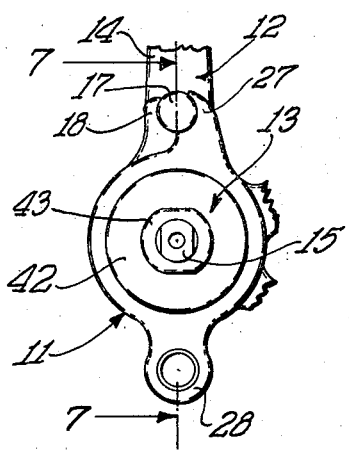
Figure 1 is an end elevational view, with parts broken away, of a clutch mechanism embodying the features of the instant invention.

Referring more particularly to the drawings, the clutch mechanism shown therein as a preferred embodiment of the instant invention is specifically that employed between the actuating mechanism and the accumulator mechanism of a calculating machine, as illustrated in the patent to Turck No. 2,063,962 which issued December 15, 1936. In such a clutch mechanism, the driving member thereof has an oscillating motion imparted thereto of constant amplitude, while the driven member is positively stopped after having received a variable increment of motion, the extent of movement of the driven member depending upon the digital value of the particular key denominationally associated with the clutch mechanism that has been depressed. The details of the latter mechanism are disclosed in the patent above referred to and, since they form no part of the instant invention, are not illustrated herein.

The clutch mechanism shown in the drawings comprises a driving member 11, a driven member 12, and connections therebetween, indicated generally by reference numeral 13, which permit limited movement of the driving member relative to the driven member when the magnitude of the resisting force set up by the former exceeds a predetermined value. The driven member 12 comprises a lever 14 through which a hub 15 extends (Fig. 7) which is rigidly secured thereto in any suitable manner. Exteriorly of the lever 14, one end of the hub 15 is provided with a flange 16 having at its outer end a reduced portion 20. The hub 15 is rigidly held against the lever 14 in any suitable manner. The lever 14, in the specific embodiment of the invention which is intended for use in the calculating machine of the patent above referred to, comprises one arm of an actuating sector which is adapted to operate the accumulator mechanism of the calculating machine, the other arms of such actuating sector also being shown as broken off in Figs. 1 to 5.

A stud 17 extends through and is rigidly secured to the lever 14 in any suitable manner, and is provided with an enlarged head portion on one side of the lever which is adapted to be engaged by a bifurcated arm 18 (Fig. 5) formed as an extension of a driving disc 19, which is mounted upon and secured to the hub 15 directly adjacent and in contact with the lever 14. The hub 15 in the instant embodiment is provided with an undercut portion 30 which is adapted to be upset to rigidly secure the hub 15, lever 14 and disc 19 together as shown in Figs. 7 and 8. The outer face of the disc 19 is provided with four similar recesses 21 extending circumferentially around the hub 15 in spaced relationship thereto. Each of the recesses 21 comprises a relatively deep circular portion 22 at one end, a relatively shallow circular portion 23 at the other end, and a cam surface 24 joining the circular end portions and sloping upwardly from the deeper portion 22 toward the relatively shallow circular portion 23. A ball 25 is movably disposed in each of the recesses 21 (Figs. 7 and 8). The cam surface 24 is sloped upwardly to retard the return speed of the ball as hereinafter described.

The driving member 11 comprises a disc having a central bore of slightly larger diameter than that of the hub 15 (Fig. 7) and four apertures 26 extending therethrough which are equally spaced circumferentially around the central bore (Fig. 4) and are of substantially the same diameter as the balls 25, one of the latter being slidably disposed within each of said apertures. The driving member 11 is also provided with diametrically opposed extensions 27 and 28. The extension 27 is formed with an arcuate recess which is adapted to engage the stud 17 of the driven member 12. The extension 28 is provided with an aperture within which a suitable bearing sleeve 29 is press fitted. This extension 28 is adapted to be connected in any suitable manner with a source of power for imparting reciprocating motion to the driving member 11, the driving stroke of the member 11 being in a clockwise direction, viewing Figs. 1 to 5, with the idle or return stroke being in the opposite or counter-clockwise direction.

The end of the hub 15 opposite that to which the driven member 12 is secured is threaded for a portion of its length at 31 (Fig. 7), and for part of the length of the threaded portion, is provided with a pair of diametrically opposed, flattened surfaces 32. A bearing sleeve 33 (Figs. 7 and 8) is screwed onto the threaded portion 31 of the hub 15 and is provided at its inner end with a relatively thin annular extension 34 which is disposed between the central bore of the driving member 11 and the hub 15 to form a bearing for the driving member. Intermediate its length and directly adjacent the inner end of the extension 34, the sleeve 33 is provided with an annular flange 35 which prevents axial movement of the driving member 11 relative to the driven member 12 and hub 15.

Rotatably mounted upon the sleeve 33 is a pressure disc 36 (Figs. 3 and 7 to 9), the inner surface of which engages against the several balls 25. The inner end of a thrust member 37 engages against the outer surface of the pressure disc 36. This thrust member 37 is provided with an enlarged bore at its inner end which is adapted to slidably engage the outer surface of the bearing sleeve 33. The outer portion of the thrust member 37 is provided with a bore of slightly smaller diameter than that of its inner end which is flattened on each of two diametrically opposed sides at 38 (Fig. 3) to slidably engage the flattened surface 32 of the hub 15. In this manner, the thrust member 37 is permitted to slide longitudinally of the hub 15 on the bearing sleeve 33, while being prevented from rotating relative thereto. Adjacent its inner end, the thrust member 37 is also provided with an annular flange 39 against which the inner end of a volute or flat coiled spring 41 is adapted to engage.

Figure 4:
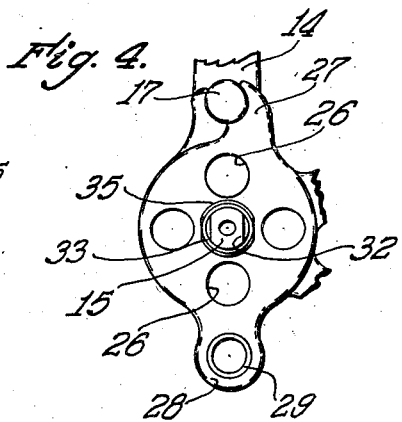
Figure 4 is a view similar to Fig. 3 with the pressure plate and balls removed.
Figure 5:
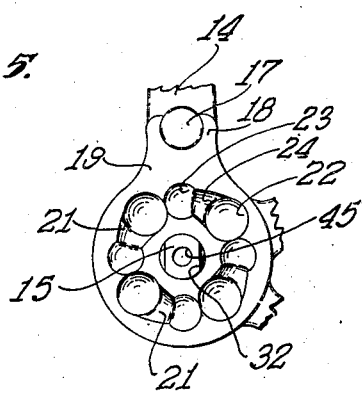
Figure 5 is a view similar to Fig. 4 with the driving member of the clutch mechanism removed.
Figure 6:
Figure 6 is an elevational view of the spring in extended position.

Referring more particularly to Fig. 6, it will be seen that the spring 41 is coiled in volute form from a flat strip of metal. In order to function in the desired manner and to permit it to be subjected to an almost indefinite number of compressive actions, the spring 41 is suitably tempered after having been coiled or formed as shown in Fig. 6. When assembled with the other elements of the connecting mechanism 13, as shown in Fig. 4, the outer portion of the spring 41 is housed and engaged by a suitable cap member 42. The cap member 42 is adapted to be rigidly retained in any selected adjusted position by a pair of suitable lock nuts 43 which are threaded upon the outer end of the hub 15. With this arrangement, the amount of pressure exerted by the spring 41 against the thrust member 37, pressure plate 36 and balls 25 may be varied by screwing the nuts 43 inwardly or outwardly on the hub 15. The reactive force of the spring 41 is exerted in a lateral or axial direction against the thrust member 37 at the inner end of the spring. It will be seen, particularly from Fig. 7, that the spring 41 is so constructed and arranged that, while axial movement of the cap member 42 will result in the spring exerting a greater or lesser amount of pressure against the thrust member 37, outward movement of the member 37 against the inner end of the spring, if limited to a very short distance, will result in the spring exerting a substantially constant force thereagainst throughout such distance. This relatively short distance through which the thrust member 37 will be moved constitutes the working range of the spring 41.

In the operation of the clutch mechanism above described, the driving member 11 has an oscillating motion applied thereto through the agency of the extension 28, which may be divided into a driving cycle and an idle or return cycle. The driving cycle comprises rotation of the member 11 in a clockwise direction (viewing Figs. 1 to 5), while the return cycle comprises rotation thereof in a reverse direction. Preferably, as shown in Figs. 1 to 5, the hub 15 is provided with an axial bore 45, so that it may be mounted upon a suitable supporting shaft to facilitate rotation or oscillation of the clutch mechanism thereon.

In the normal position of the clutch mechanism, as shown in Figs. 1 and 7, the extension 27 of the driving member 11 abuts against the stud 17 of the driven member 12, and the balls 25 are disposed within the shallow portions 23 of their respective recesses 21 in the disc 19. If the balls were to be held rigidly in engagement with these circular portions 23 of the recesses, any rotative movement imparted to the driving member 11 would be transmitted thereby to the driven member 12. However, the axial force exerted by the spring 41 is the only thing that is maintaining the balls in these shallow portions 23 of the recesses 21. Consequently, if a reactive force of sufficient magnitude is applied to the driven member 12 while the driving member 11 is being rotated, the balls 25 will be forced outwardly from the shallow portions 23 of the recesses 21 onto the sloping surfaces 24 of said recesses against the action of the spring 41, moving the pressure plate 36, the thrust member 37 and the inner end of the spring 41 to the right, viewing Fig. 7. This will result in the driving member 11 being moved or rotated relative to the driven member 12.

It will be understood that the magnitude of the reactive force which it is required to be applied to the driven member 12 in order to effect movement of the driving member 11 relative thereto may be varied within certain limits by adjusting the axial position of the lock nuts 43. Having once applied sufficient reactive force to the driven member 12 to cause the balls 25 to be moved out of the shallow circular portions 23 onto the sloping surfaces 24, continued application of the same amount of reactive force to the driven member 12 coupled with continued rotation of the driving member 11, will result in the balls 25 being moved along the full extent of the surfaces 24 and into the relatively deep portions 22 of the recesses 21. Since the surfaces 24 slope inwardly in this direction, an increase in the reactive force being applied to the driven member 12 will not be necessitated in order to result in continued movement of the driving member 11 relative to the driven member 12. Also, as explained above, the force exerted by the spring 41 during the full extent of movement of the members 36 and 37, which constitutes the working range of the spring, is substantially constant.

Figure 2:
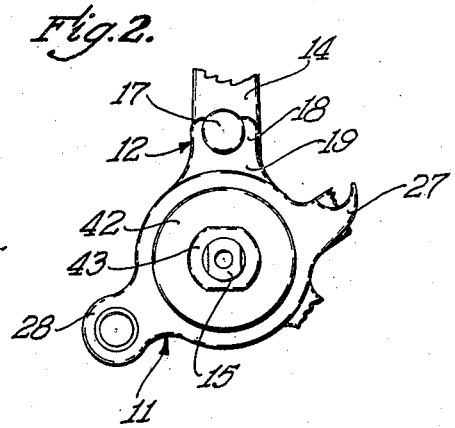
Figure 2 is a view similar to Fig. 1 with the parts shown in extended position.
Figure 3:
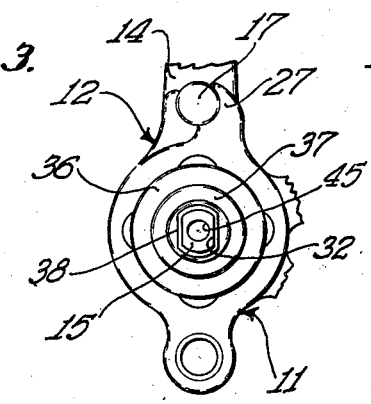
Figure 3 is a view similar to Fig. 1 with the spring and end plate therefor removed.

The relative positions of the driving and driven members, with the balls 25 disposed within the end portions 22 of the recesses 21, is illustrated in Fig. 2. Return movement of the driving member 11, with the instant mechanism, will be relative to the driven member 12 until the extension 27 contacts the stud 17. Thereafter, further return movement of the driving member 11 will result in similar movement of the driven member 12. In such return movement of the driving member 11 relative to the driven member 12, the balls 25 will be returned to their original positions in the shallow portions 23 of the recesses 21. The sloping cam surface 24 retards the return speed by increasing the compression of the spring 41. In order to more fully illustrate the relative movements between the several parts of the instant clutch mechanism, reference is made to Fig. 8 in which the driving member 11 is at a position intermediate its position of Figs. 1 and 2, with the balls 25 in engagement with the sloping surfaces 24 of the recesses 21.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Slip clutch mechanism, comprising a driving member mounted for oscillating movement, a driven member mounted for oscillating movement, and connections therebetween to permit limited movement by said driving member of said driving member relative to said driven member, including balls disposed within associated recesses in said members, and a volute spring so constructed and arranged as to exert a substantially constant pressure within its working range in an axial direction to resiliently restrain said balls against movement relative to said recesses in a direction normal to the planes of movement of said members.

2. Slip clutch mechanism, comprising a driving member mounted for oscillating movement, a driven member mounted for oscillating movement, and connections therebetween to permit limited movement by said driving member of said members relative to each other, including balls disposed within associated recesses of said members, the recesses in said driving member extending therethrough and the diameter of said balls being greater than the thickness of said driving member so that said balls project beyond said driving member in a direction normal to the planes of movement of said members, a pressure plate, and a volute spring so constructed and arranged as to maintain said pressure plate in constant contact with said balls to resiliently retain said balls in said recesses to resist movement thereof at all times relative to said members in a direction normal to the planes of movement of the latter.

3. Slip clutch mechanism, comprising a rotatable shaft, a driven member secured to said shaft, a driving member rotatably mounted on said shaft adjacent said driven member, a plurality of recesses, each of varying depth, formed in the surface of said driven member adjacent said driving member, apertures associated with said recesses and extending through said driving member, a ball disposed within each of said recesses and extending through the associated aperture, a pressure plate slidably mounted on said shaft in engagement with said balls, a volute spring surrounding said shaft and exerting pressure at one end against said plate in an axial direction to yieldably resist movement of said balls axially of said shaft, and means for preventing movement of the other end of said spring relative to said shaft.

4. Slip clutch mechanism, comprising a rotatable shaft, a driven member secured to said shaft, a driving member rotatably mounted on said shaft adjacent said driven member, a plurality of recesses, each of varying depth, formed in the surface of said driven member adjacent said driving member, apertures associated with said recesses and extending through said driving member, a ball disposed within each of said recesses and extending through the associated aperture, a pressure plate mounted on said shaft in engagement with said balls, a volute spring surrounding said shaft and exerting pressure at one end against said plate in an axial direction to yieldably resist movement of said balls axially of said shaft, and means for preventing movement of the other end of said spring relative to said shaft, said last means being adjustable axially of said shaft to vary the pressure exerted by said spring.

5. Slip clutch mechanism, comprising a driving member mounted for oscillating movement, a driven member mounted for oscillating movement, and connections therebetween to permit limited movement by said driving member of said driving member relative to said driven member, including means disposed within said members, and a volute spring so constructed and arranged as to exert a substantially constant pressure within its working range in an axial direction to resiliently restrain said means at all times against movement relative to said members in a direction normal to the planes of movement of said members.

6. Slip clutch mechanism, comprising a driving member mounted for oscillating movement, a driven member mounted for oscillating movement by said driving member, and connections therebetween to permit limited movement of said members relative to each other, including balls disposed within associated recesses of said members, the recesses in said driving member extending therethrough, a pressure disc, a thrust plate mounted for sliding movement in a direction normal to the planes of movement of said members and having means for preventing movement relative to said members parallel to said planes of movement thereof, and a volute spring so constructed and arranged as to exert pressure against said thrust plate to maintain said pressure disc in constant contact with said balls to resiliently retain said balls in said recesses to resist movement thereof at all times relative to said members in a direction normal to the planes of movement of the latter.

FREDERICK A. NIEMANN.